United States Patent
Wu et al.

(10) Patent No.: US 11,217,873 B2
(45) Date of Patent: Jan. 4, 2022

(54) ANTENNA MODULE

(71) Applicants: Chao-Lin Wu, Taipei (TW); Shih-Chia Liu, Taipei (TW); Yen-Hao Yu, Taipei (TW); Li-Chun Lee, Taipei (TW); Jhin-Ciang Chen, Taipei (TW); Jui-Hung Lai, Taipei (TW)

(72) Inventors: Chao-Lin Wu, Taipei (TW); Shih-Chia Liu, Taipei (TW); Yen-Hao Yu, Taipei (TW); Li-Chun Lee, Taipei (TW); Jhin-Ciang Chen, Taipei (TW); Jui-Hung Lai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 121 days.

(21) Appl. No.: 16/253,170

(22) Filed: Jan. 21, 2019

(65) Prior Publication Data
US 2019/0237847 A1    Aug. 1, 2019

Related U.S. Application Data

(60) Provisional application No. 62/621,561, filed on Jan. 24, 2018.

(51) Int. Cl.
*H01Q 1/22* (2006.01)
*H04B 1/00* (2006.01)
(Continued)

(52) U.S. Cl.
CPC ............ *H01Q 1/22* (2013.01); *H01Q 13/10* (2013.01); *H04B 1/0053* (2013.01);
(Continued)

(58) Field of Classification Search
CPC .......... H01Q 1/22; H01Q 13/10; H01Q 1/243; H01Q 5/335; H01Q 9/42; H01Q 5/371;
(Continued)

(56) References Cited

U.S. PATENT DOCUMENTS

2015/0270618 A1*  9/2015  Zhu .................. H01Q 13/103
                                                   343/702
2015/0340756 A1*  11/2015  Huang ................ H01Q 1/243
                                                   343/702

FOREIGN PATENT DOCUMENTS

CN      103199335      7/2013
CN      103779660      5/2014
(Continued)

OTHER PUBLICATIONS

"Office Action of Taiwan Counterpart Application," dated Dec. 11, 2019, p. 1-p. 6.
(Continued)

*Primary Examiner* — Alexander H Taningco
*Assistant Examiner* — Amy X Yang
(74) *Attorney, Agent, or Firm* — JCIPRNET

(57) ABSTRACT

The disclosure provides an antenna module adapted for an electronic device having a metal casing. The antenna module includes an antenna structure and a slot structure. The antenna structure includes a radiation portion, a feeding portion, a ground portion and an extension portion, wherein the feeding portion, the ground portion and the extension portion are connected to the radiation portion. The slot structure has an open end and a closed end, wherein the open end of the slot structure is adjacent to the extension portion of the antenna structure. The antenna structure is excited and resonates to generate a first antenna resonant mode, and the slot structure is coupled to the antenna structure and resonates to generate a second antenna resonant mode.

14 Claims, 8 Drawing Sheets

(51) Int. Cl.
*H04B 1/10* (2006.01)
*H04B 1/16* (2006.01)
*H04B 1/04* (2006.01)
*H01Q 13/10* (2006.01)

(52) U.S. Cl.
CPC ......... *H04B 1/0057* (2013.01); *H04B 1/0475* (2013.01); *H04B 1/10* (2013.01); *H04B 1/16* (2013.01)

(58) Field of Classification Search
CPC ............ H01Q 1/48; H01Q 1/50; H01Q 5/315; H01Q 1/36; H01Q 5/50; H01Q 3/03; H04B 1/16; H04B 1/0057; H04B 1/0475; H04B 1/10; H04B 1/0053
USPC ........................................................ 343/702
See application file for complete search history.

(56) References Cited

FOREIGN PATENT DOCUMENTS

TW            553500 U   * 12/2017                H01Q 1/36
TW         M553500     12/2017

OTHER PUBLICATIONS

Office Action of China Counterpart Application, dated Mar. 20, 2020, p. 1-p. 9.

\* cited by examiner

ANTENNA MODULE

CROSS REFERENCE TO RELATED APPLICATION

This application claims the priority benefit of U.S. provisional application Ser. No. 62/621,561, filed on Jan. 24, 2018. The entirety of the above-mentioned patent application is hereby incorporated by reference herein and made a part of specification.

BACKGROUND

Technical Field

The disclosure relates to an antenna module, and more particularly to an antenna module having a slot structure.

Description of Related Art

In general, an antenna applied to a metal casing must be disposed with a clearance area to have sufficient bandwidth in the frequency band used and to avoid environmental influences. However, such an antenna design is likely to cause an obvious color difference between the appearance of the antenna and the metal casing.

In addition, although currently an antenna design not disposed with a clearance area is also available, since the height of the antenna in this design is relatively limited, in addition to the possibility of causing a smaller bandwidth, this design is also likely to reduce the antenna efficiency due to the resonant frequency shift.

SUMMARY

In view of this, the disclosure provides an antenna module that may be configured to solve the above technical problems.

The disclosure provides an antenna module adapted for an electronic device having a metal casing. The antenna module includes an antenna structure and a slot structure. The antenna structure includes a radiation portion, a feeding portion, a ground portion and an extension portion, wherein the feeding portion, the ground portion and the extension portion are connected to the radiation portion. The slot structure has an open end and a closed end, wherein the open end of the slot structure is adjacent to the extension portion of the antenna structure. The antenna structure is excited and resonates to generate a first antenna resonant mode, and the slot structure is coupled to the antenna structure and resonates to generate a second antenna resonant mode.

Based on the above, with the disposition of the slot structure, the antenna module provided by the disclosure can generate the first antenna resonant mode through the excited antenna structure and, at the same time, can allow the slot structure to be coupled to the antenna structure to generate the second antenna resonant mode. In this way, the antenna module can achieve a larger bandwidth without being disposed with a clearance area, thereby improving the flexibility in design.

In order to make the aforementioned features and advantages of the disclosure comprehensible, embodiments accompanied with drawings are described in detail below.

DESCRIPTION OF THE EMBODIMENTS

Figure 1A:
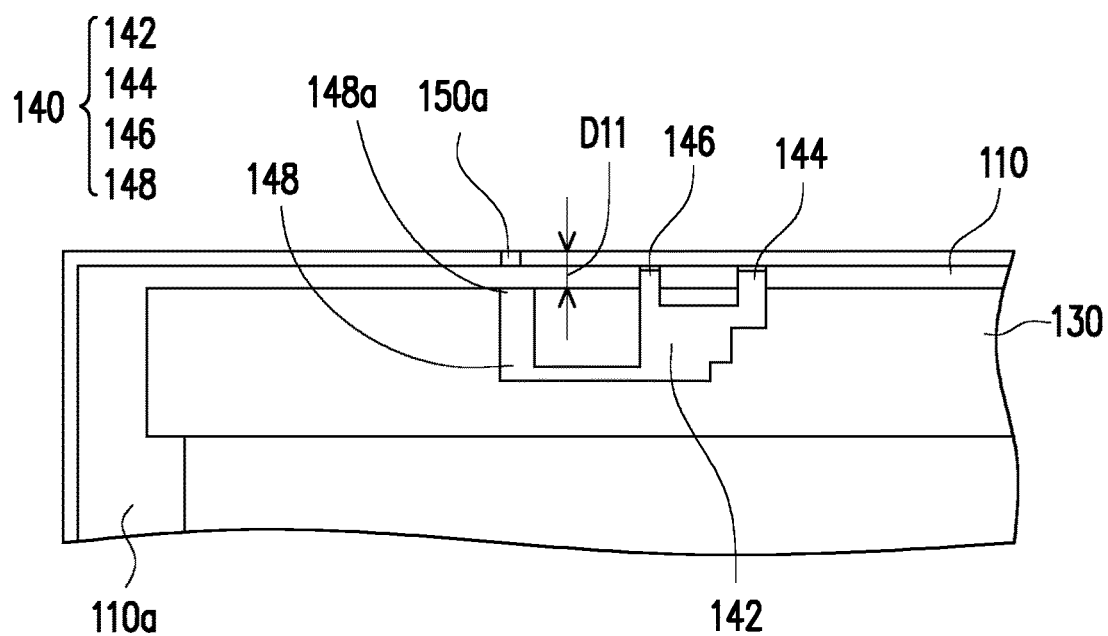
FIG. 1A is a top view of an electronic device according to a first embodiment of the disclosure.
Figure 1B:
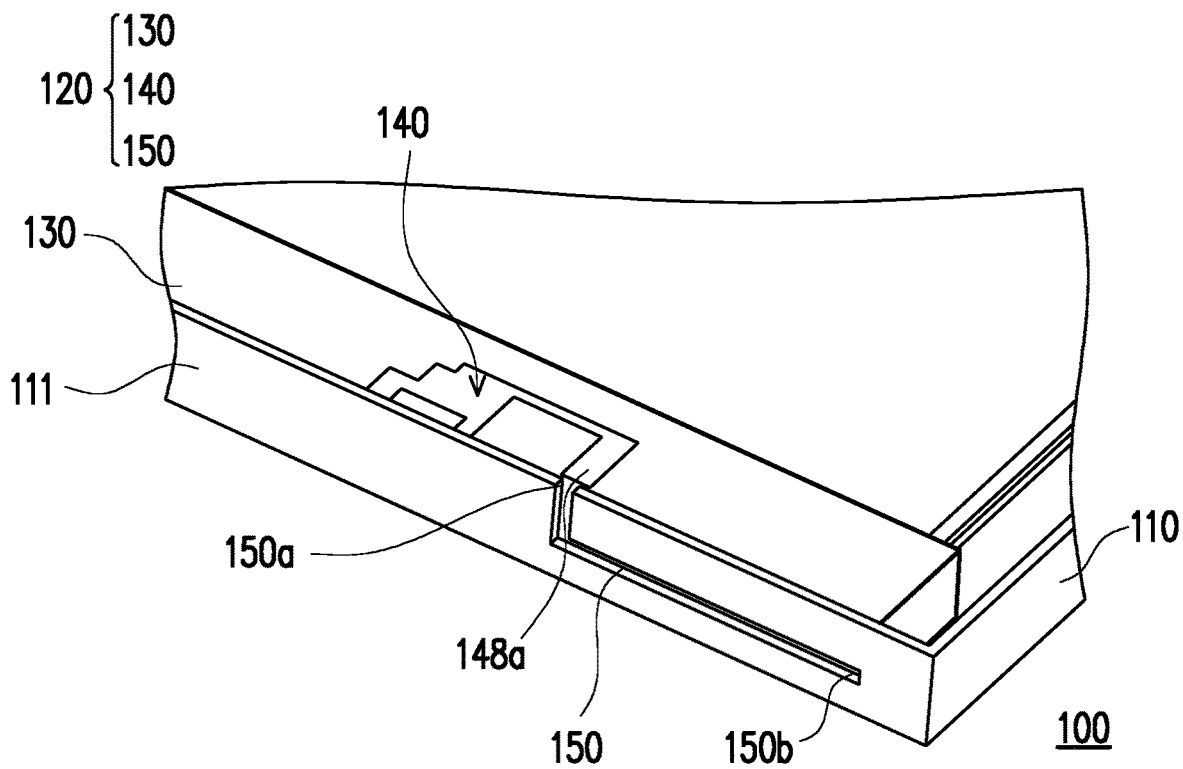
FIG. 1B is an oblique view of the electronic device according to the first embodiment of the disclosure.
Figure 1C:
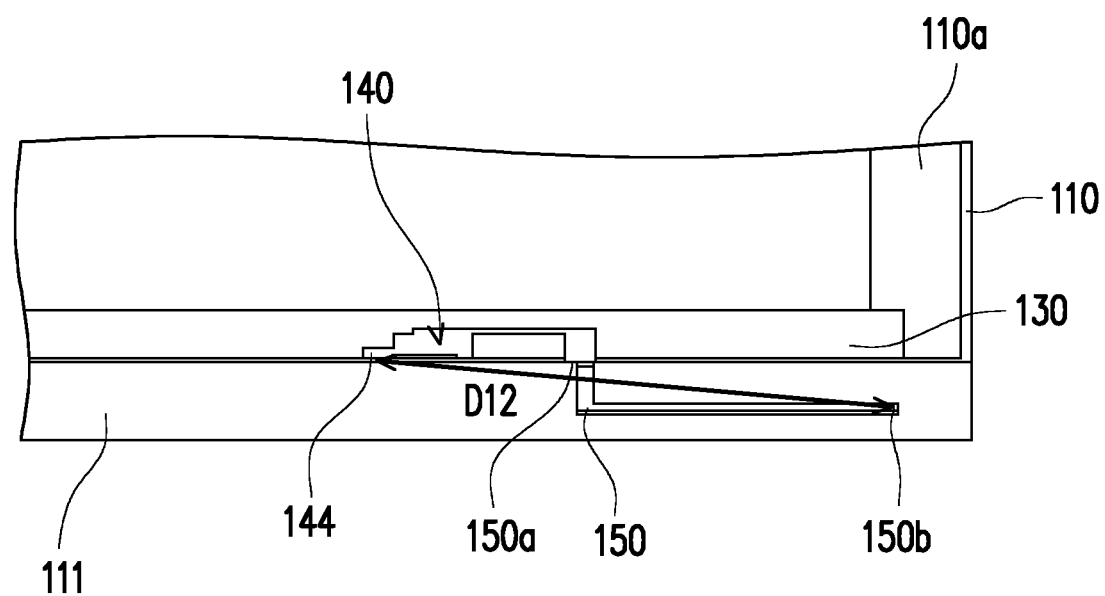
FIG. 1C is another oblique view of the electronic device according to the first embodiment of the disclosure.

With reference to FIGS. 1A, 1B and 1C, FIG. 1A is a top view of an electronic device according to a first embodiment of the disclosure, FIG. 1B is an oblique view of the electronic device according to the first embodiment of the disclosure, and FIG. 1C is another oblique view of the electronic device according to the first embodiment of the disclosure.

In the first embodiment, an electronic device 100 may include a metal casing 110 and an antenna module 120. The antenna module 120 includes a substrate 130, an antenna structure 140, and a slot structure 150. The substrate 130 is, for example, a substrate that may be configured to carry the antenna structure 140 and may be disposed in the metal casing 110. Specifically, the metal casing 110 may have a bearing surface 110a and a side 111, wherein the bearing surface 110a may be configured to carry the substrate 130. Moreover, in the first embodiment, a first orthographic projection of the antenna structure 140 on a bottom surface of the metal casing 110 does not overlap a second orthographic projection of the slot structure 150 on the bottom surface of the metal casing 110.

The antenna structure 140 is disposed on the substrate 130 and includes a radiation portion 142, a feeding portion 144, a ground portion 146 and an extension portion 148, wherein the feeding portion 144, the ground portion 146 and the extension portion 148 are connected to the radiation portion 142. In the first embodiment, the extension portion 148 extends from the radiation portion 142 to the vicinity of the side 111 of the metal casing 110, and the ground portion 146 may contact the metal casing 110. In addition, the electronic device 100 may further include a radio frequency signal module (not shown), and the feeding portion 144 may be electrically connected to the radio frequency signal module through a connection line (not shown), so that the antenna structure 140 can be excited and resonate in response to signals from the radio frequency signal module.

As shown in FIG. 1C, the slot structure 150 is, for example, an L-shaped recess disposed on the side 111 of the metal casing 110 and may have an open end 150a and a closed end 150b, wherein the open end 150a of the slot structure 150 is adjacent to the extension portion 148 of the antenna structure 140 and may be located on the same plane as the antenna structure 140. Further, the open end 150a and the closed end 150b may be located on different planes. More specifically, the open end 150a is spaced from a terminal end 148a of the extension portion 148 by a first distance D11. In different embodiments, the first distance D11 may be between 0 mm and a quarter wavelength of the desired resonant frequency. Further, the closed end 150b is spaced from the feeding portion 144 by a second distance D12, and the first distance D11 is less than the second distance D12.

In the first embodiment, the antenna structure 140 may be excited and resonate to generate a first antenna resonant mode. At the same time, the slot structure 150 may be coupled to the antenna structure 140 and resonate to generate a second antenna resonant mode. More specifically, the open end 150a of the slot structure 150 may be coupled to the terminal end 148a of the extension portion 148 and resonate to generate the above-described second antenna resonant mode. Depending on different second antenna resonant modes, the length of the slot structure 150 may be adjusted to a quarter wavelength of the resonant frequency of the second antenna resonant mode.

In detail, when the antenna structure 140 is excited, the terminal end 148a of the extension portion 148 will correspondingly generate a strong electric field. At the same time, another strong electric field also occurs at the open end 150a of the slot structure 150. In this case, the electric field of the terminal end 148a will be coupled to the electric field of the open end 150a, thereby allowing the antenna module 120 to provide the first antenna resonant mode and the second antenna resonant mode at the same time through the antenna structure 140 and the slot structure 150. In this way, the antenna module 120 may have a larger bandwidth without being disposed with a clearance area.

Figure 2:
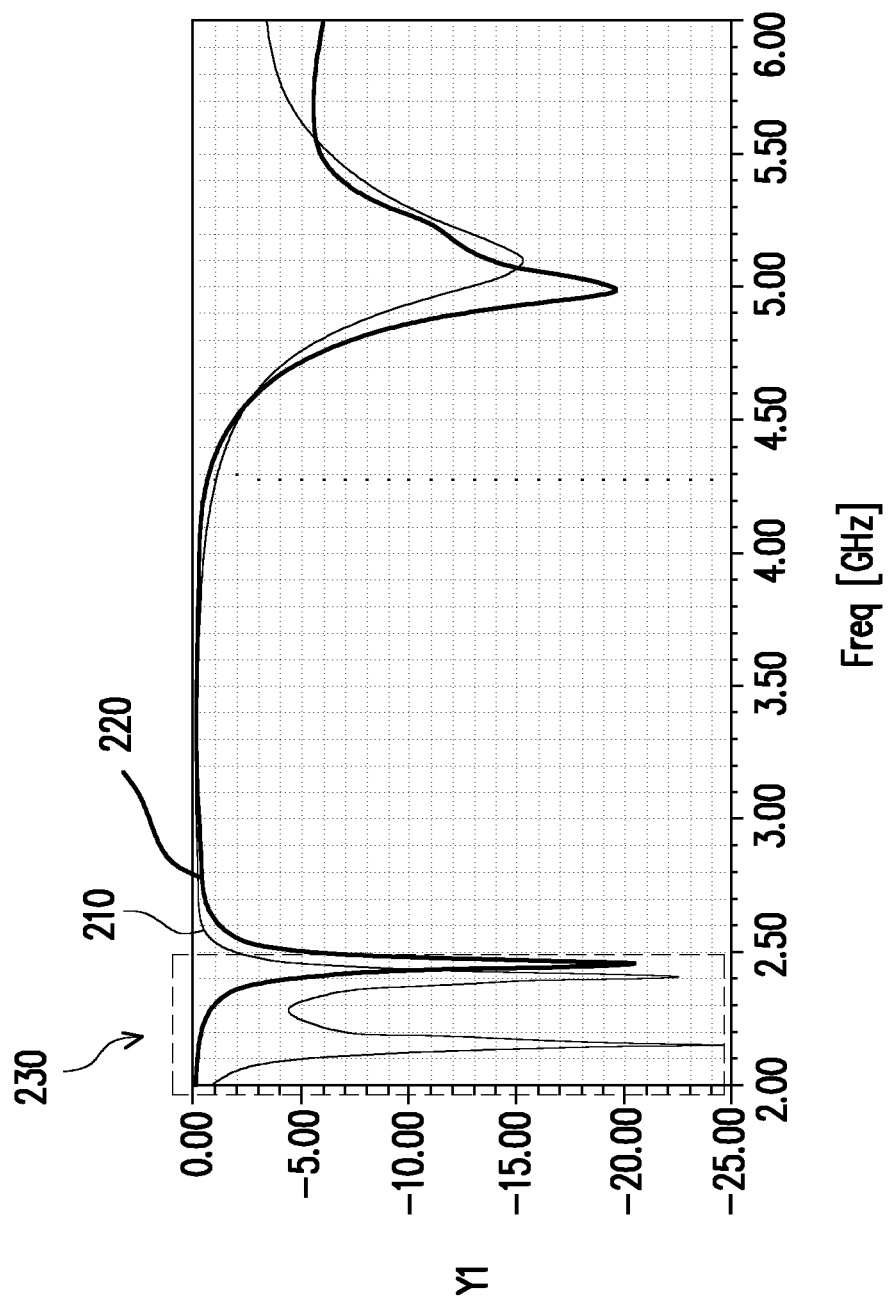
FIG. 2 is a diagram showing a return loss according to the first embodiment of the disclosure.

To provide supporting information for the advantageous effects of the disclosure, a further description is provided below with reference to FIG. 2. With reference to FIG. 2, FIG. 2 is a diagram showing a return loss according to the first embodiment of the disclosure. In FIG. 2, a curve 210 corresponds to the antenna module 120 with the slot structure 150, and a curve 220 corresponds to another antenna module without a slot structure. As can be seen from an area 230 of FIG. 2, since the antenna module 120 can additionally provide the second antenna resonant mode through the slot structure 150, the bandwidth of the antenna module 120 is greater than the bandwidth of another antenna module without a slot structure.

In light of the above, by disposing the slot structure in the antenna module, the antenna module can achieve a larger bandwidth without being disposed with a clearance area. Moreover, the overall height of the antenna module can also be less limited, thereby improving the flexibility in the antenna design.

In other embodiments, the antenna structure and the slot structure of the antenna module of the disclosure may have other aspects and are not limited to the aspect presented in the first embodiment.

Figure 3A:
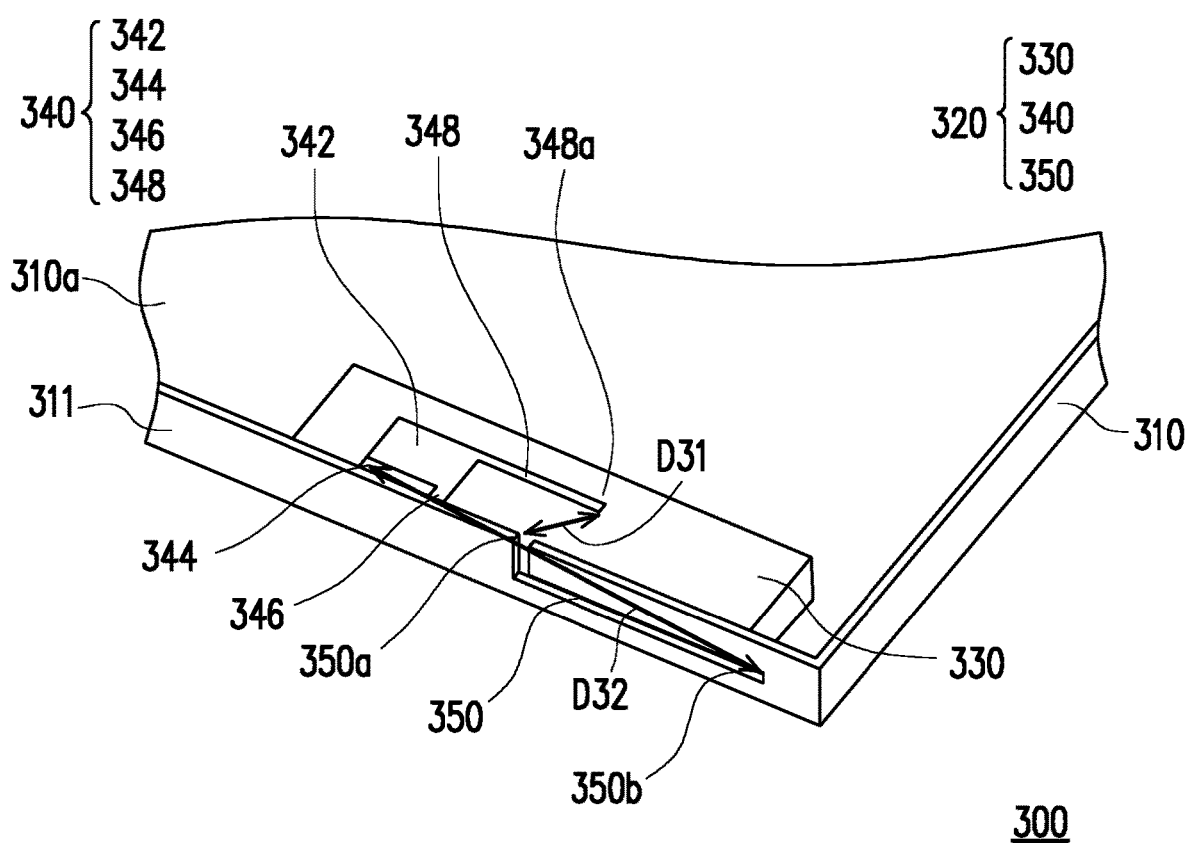
FIG. 3A is an oblique view of an electronic device according to a second embodiment of the disclosure.
Figure 3B:
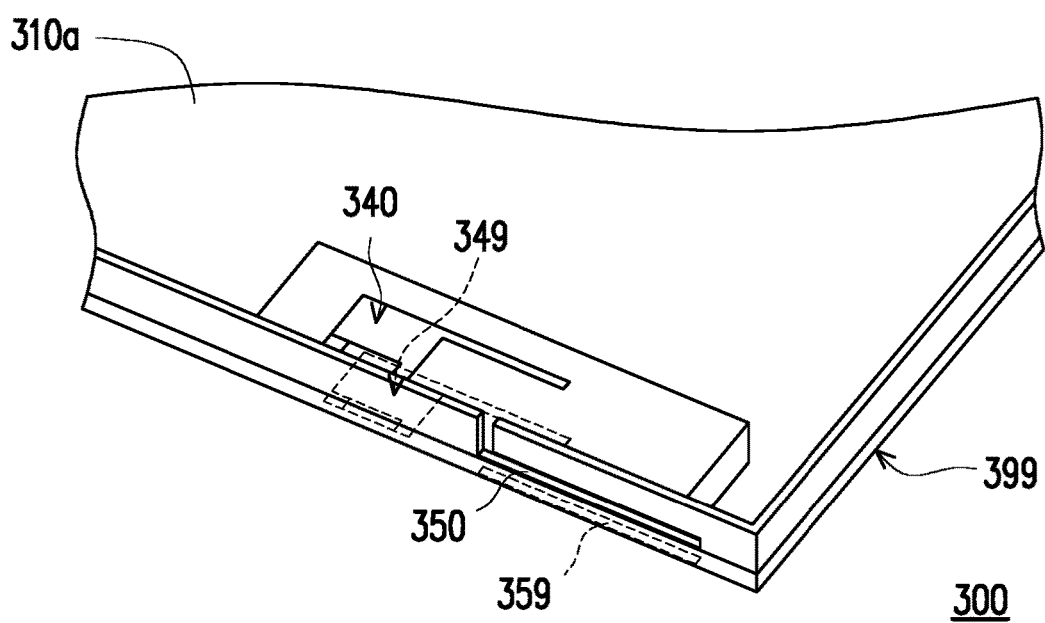
FIG. 3B is a perspective view according to FIG. 3A.

With reference to FIGS. 3A and 3B, FIG. 3A is an oblique view of an electronic device according to a second embodiment of the disclosure, and FIG. 3B is a perspective view according to FIG. 3A. In the second embodiment, an electronic device 300 may include a metal casing 310 and an antenna module 320. The antenna module 320 includes a substrate 330, an antenna structure 340, and a slot structure 350. The substrate 330 is, for example, a substrate that may be configured to carry the antenna structure 340 and may be disposed in the metal casing 310. Specifically, the metal casing 310 may have a bearing surface 310a and a side 311, wherein the bearing surface 310a may be configured to carry the substrate 330. Moreover, as shown in FIG. 3B, a first orthographic projection 349 of the antenna structure 340 on a bottom surface 399 of the metal casing 310 does not overlap a second orthographic projection 359 of the slot structure 350 on the bottom surface 399 of the metal casing 310.

The antenna structure 340 is disposed on the substrate 330 and includes a radiation portion 342, a feeding portion 344, a ground portion 346 and an extension portion 348, wherein the feeding portion 344, the ground portion 346 and the extension portion 348 are connected to the radiation portion 342. In the second embodiment, the ground portion 346 may contact the metal casing 310. In addition, the electronic device 300 may further include a radio frequency signal module (not shown), and the feeding portion 344 may be electrically connected to the radio frequency signal module through a connection line (not shown), so that the antenna structure 340 can be excited and resonate in response to signals from the radio frequency signal module.

As shown in FIGS. 3A and 3B, the slot structure 350 is, for example, an L-shaped recess disposed on the side 311 of the metal casing 310 and may have an open end 350a and a closed end 350b, wherein the open end 350a of the slot structure 350 is adjacent to the extension portion 348 of the antenna structure 340 and may be located on the same plane as the antenna structure 340. Further, the open end 350a and the closed end 350b may be located on different planes. More specifically, the open end 350a is spaced from a terminal end 348a of the extension portion 348 by a first distance D31. In different embodiments, the first distance D31 may be between 0 mm and a quarter wavelength of the desired resonant frequency. Further, the closed end 350b is spaced from the feeding portion 344 by a second distance D32, and the first distance D31 is less than the second distance D32.

In the second embodiment, the antenna structure 340 may be excited and resonate to generate the first antenna resonant mode. At the same time, the slot structure 350 may be coupled to the antenna structure 340 and resonate to generate the second antenna resonant mode. More specifically, the open end 350a of the slot structure 350 may be coupled to the terminal end 348a of the extension portion 348 and resonate to generate the above-described second antenna resonant mode. Depending on different second antenna resonant modes, the length of the slot structure 350 may be adjusted to a quarter wavelength of the resonant frequency of the second antenna resonant mode. In this way, the antenna module 320 may have a larger bandwidth without being disposed with a clearance area. For related principles, reference may be made to the description in the first embodiment, and details are not described herein.

Figure 4:
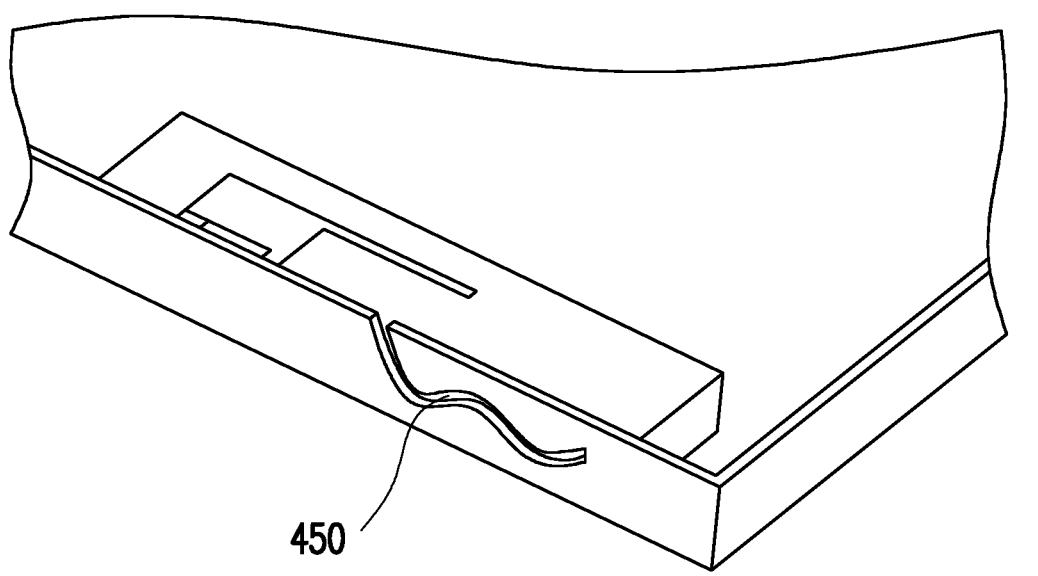
FIG. 4 is an oblique view of an electronic device according to a third embodiment of the disclosure.

With reference to FIG. 4, FIG. 4 is an oblique view of an electronic device according to a third embodiment of the disclosure. In the third embodiment, the aspect of an electronic device 400 is substantially the same as the electronic device 300 of the second embodiment, except that a slot structure 450 in the electronic device 400 may be in a wavy shape. It should be understood that the slot structure of the disclosure is not limited to the aspect shown in FIG. 4. Any slot structure having an open end and a closed end and having a length of a quarter wavelength of the corresponding resonant frequency shall fall within the scope covered by the disclosure.

Figure 5A:
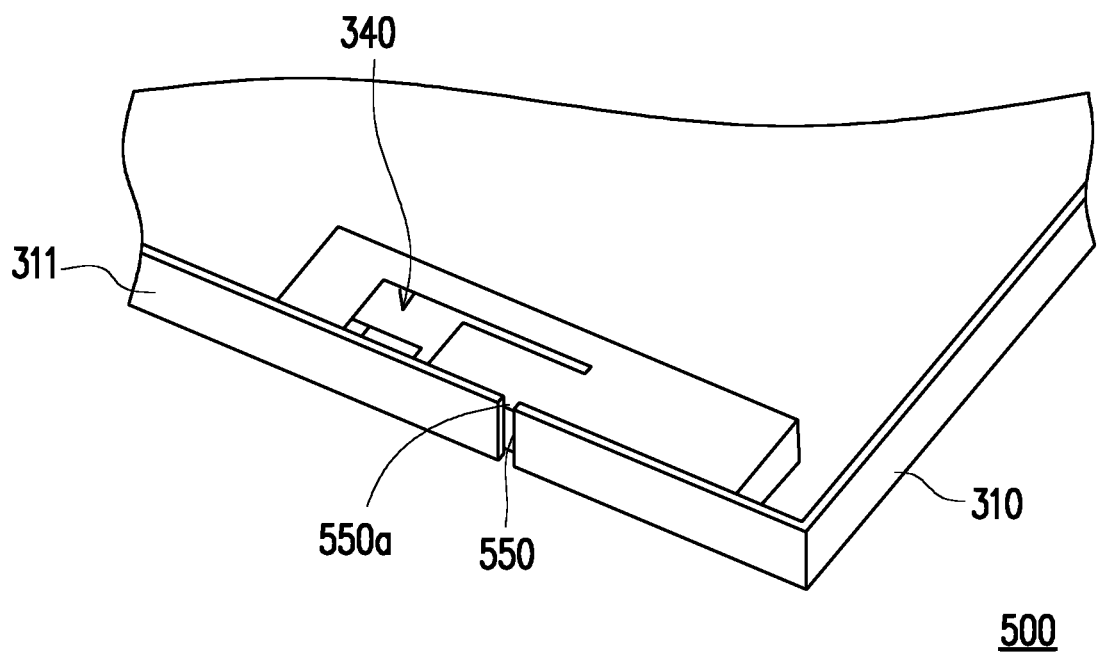
FIG. 5A is an oblique view of an electronic device according to a fourth embodiment of the disclosure.
Figure 5B:
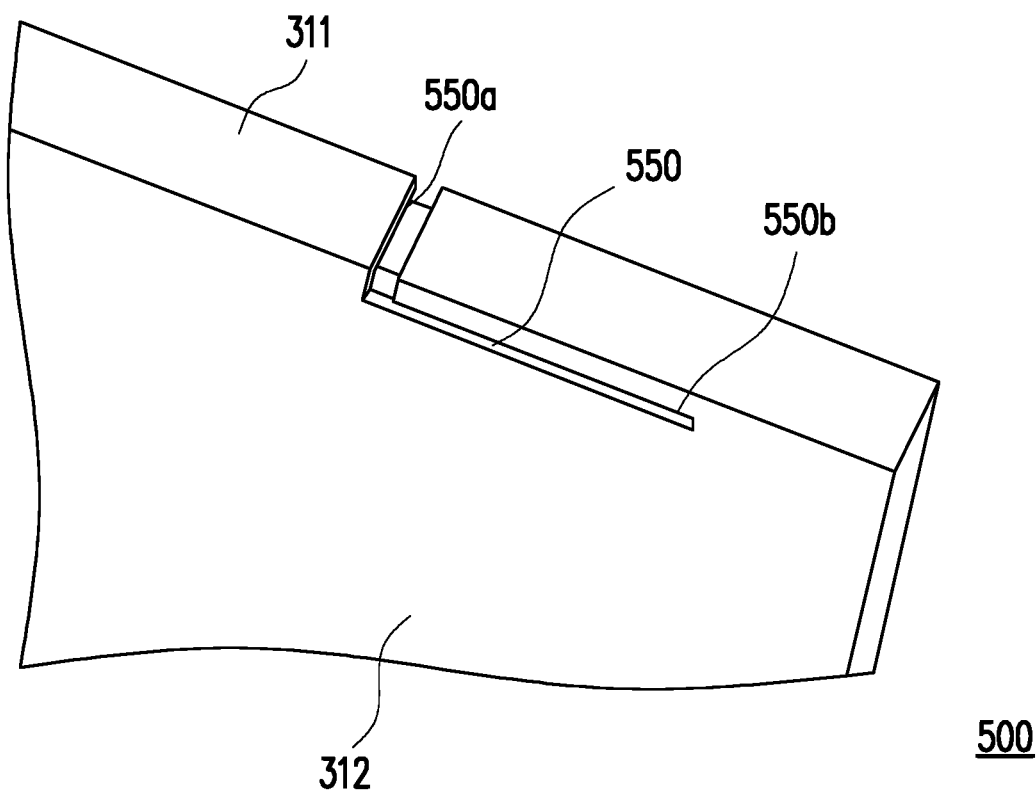
FIG. 5B is an oblique bottom view of the electronic device according to the fourth embodiment of the disclosure.

With reference to FIGS. 5A and 5B, FIG. 5A is an oblique view of an electronic device according to a fourth embodiment of the disclosure, and FIG. 5B is an oblique bottom view of the electronic device according to the fourth embodiment of the disclosure. In the fourth embodiment, the aspect of an electronic device 500 is substantially the same as the electronic device 300 of the second embodiment, except that a slot structure 550 in the electronic device 500 may be presented in an aspect different from the slot structure 350.

As shown in FIGS. 5A and 5B, the metal casing 310 of the electronic device 500 may further include a bottom 312, and the slot structure 550 may be disposed on the metal casing 310 and extends from the side 311 of the metal casing 310 to the vicinity of the bottom 312 of the metal casing 310. Moreover, an open end 550a of the slot structure 550 may be located on the same plane as the antenna structure 340, and the open end 550a and a closed end 550b may be located on different planes. Similarly, the slot structure of the disclosure is not limited to the aspect shown in FIG. 5 either, and any slot structure having an open end and a closed end and having a length of a quarter wavelength of the corresponding resonant frequency shall fall within the scope covered by the disclosure.

Moreover, in the fourth embodiment, a first orthographic projection (not shown) of the antenna structure 340 on a bottom surface of the metal casing 310 does not overlap a second orthographic projection (not shown) of the slot structure 550 on the bottom surface of the metal casing 310. However, in other embodiments, in an aspect in which the width of the slot structure 550 in FIG. 5B is adjusted to be wider or the slot structure 550 is slightly adjusted to a position closer to the lower part of FIG. 5B, the first orthographic projection of the antenna structure 340 on the bottom surface of the metal casing 310 may (partially) overlap the second orthographic projection of the slot structure 550 on the bottom surface of the metal casing 310, but the disclosure is not limited thereto.

Figure 6:
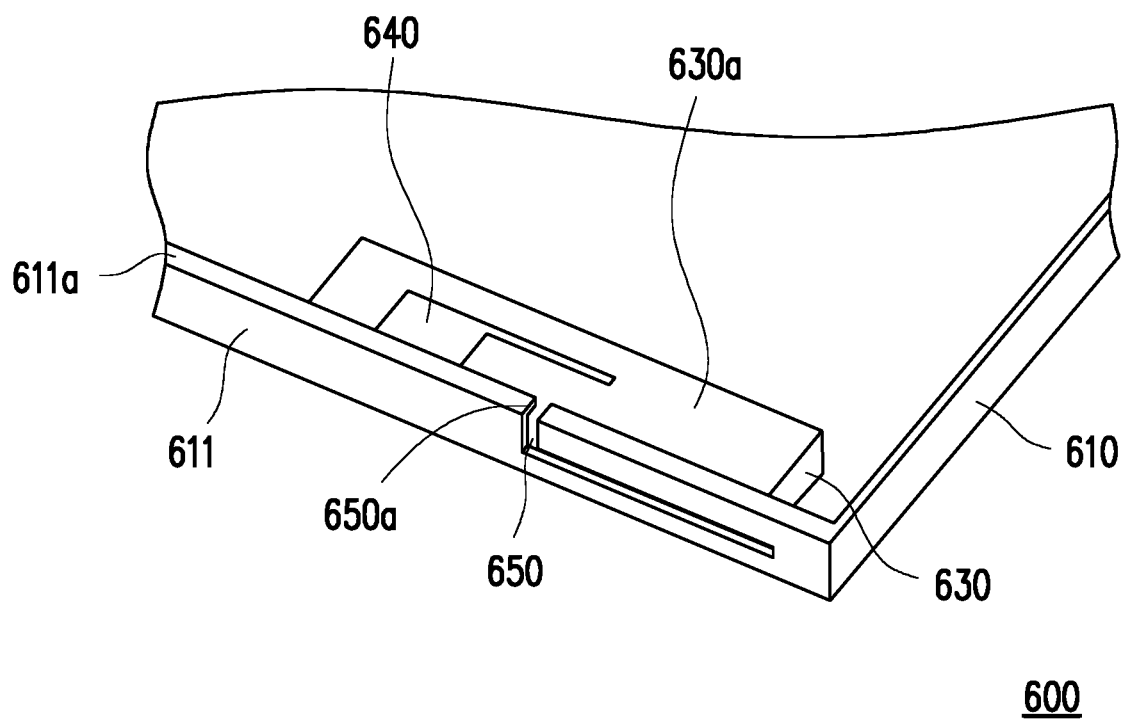
FIG. 6 is an oblique view of an electronic device according to a fifth embodiment of the disclosure.

With reference to FIG. 6, FIG. 6 is an oblique view of an electronic device according to a fifth embodiment of the disclosure. In FIG. 6, an antenna structure 640 of an electronic device 600 may be disposed on a top surface 630a of a substrate 630. In addition, a slot structure 650 may be disposed on a side 611 of a metal casing 610. In the fifth embodiment, the side 611 may have a top surface 611a that may be parallel to the top surface 630a of the substrate 630, and an open end 650a of the slot structure 650 may be located on the top surface 611a of the side 611. That is, the open end 650a and the antenna structure 640 may be located on the same plane.

In some embodiments, the antenna structure and the slot structure in the antenna module of the disclosure may be integrally disposed on the substrate, which will be specifically described below with reference to FIGS. 7 and 8.

Figure 7:
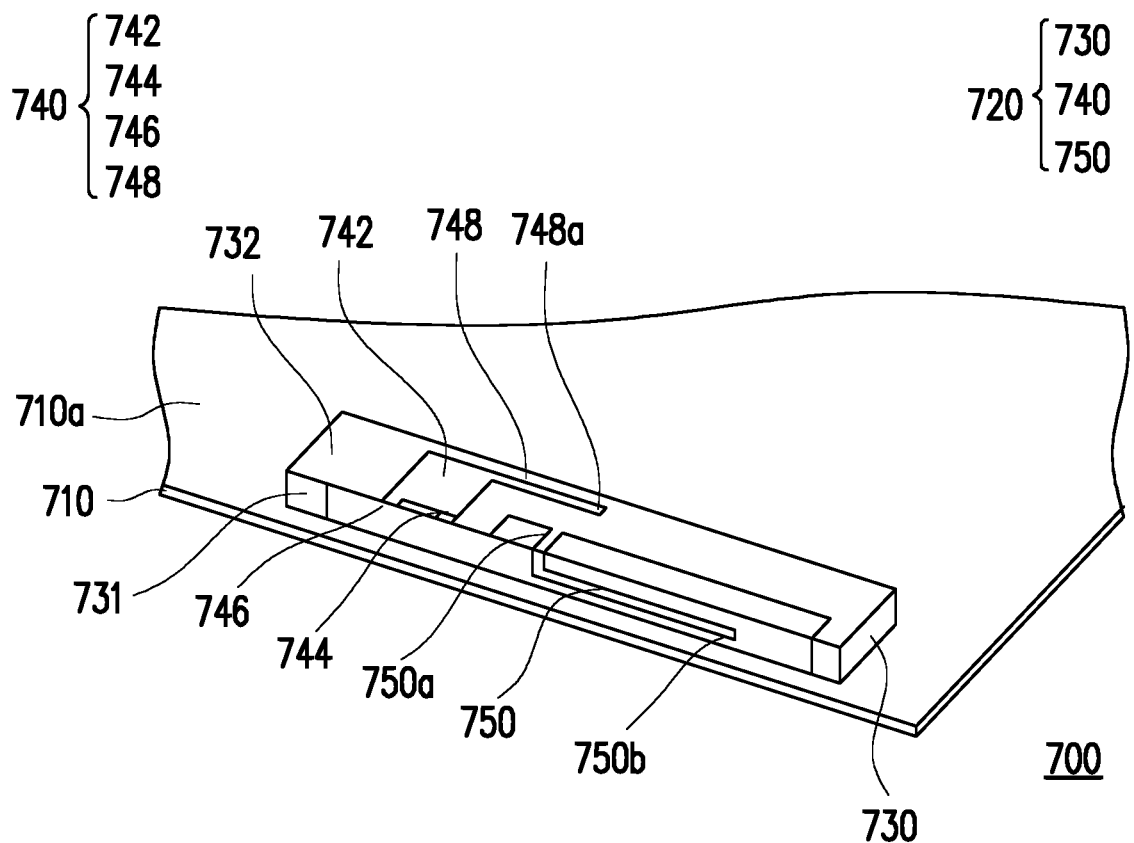
FIG. 7 is an oblique view of an electronic device according to a sixth embodiment of the disclosure.

With reference to FIG. 7, FIG. 7 is an oblique view of an electronic device according to a sixth embodiment of the disclosure. In the sixth embodiment, an electronic device 700 may include a metal casing 710 and an antenna module 720. The antenna module 720 includes a substrate 730, an antenna structure 740, and a slot structure 750. The substrate 730 is, for example, a substrate that may be configured to carry the antenna structure 740 and may be disposed in the metal casing 710. Specifically, the metal casing 710 may have a bearing surface 710a, wherein the bearing surface 710a may be configured to carry the substrate 730.

The antenna structure 740 is disposed on the substrate 730 and includes a radiation portion 742, a feeding portion 744, a ground portion 746 and an extension portion 748, wherein the feeding portion 744, the ground portion 746 and the extension portion 748 are connected to the radiation portion 742. In addition, the electronic device 700 may further include a radio frequency signal module (not shown), and the feeding portion 744 may be electrically connected to the radio frequency signal module through a connection line (not shown), so that the antenna structure 740 can be excited and resonate in response to signals from the radio frequency signal module.

As shown in FIG. 7, the slot structure 750 is, for example, a slot disposed on a side 731 of the substrate 730 and may have an open end 750a and a closed end 750b, wherein the open end 750a of the slot structure 750 is adjacent to the extension portion 748 of the antenna structure 740 and may be located on the same plane as the antenna structure 740. Further, the open end 750a and the closed end 750b may be located on different planes.

In the sixth embodiment, the antenna structure 740 may be excited and resonate to generate the first antenna resonant mode. At the same time, the slot structure 750 may be coupled to the antenna structure 740 and resonate to generate the second antenna resonant mode. More specifically, the open end 750a of the slot structure 750 may be coupled to a terminal end 748a of the extension portion 748 and resonate to generate the above-described second antenna resonant mode. Depending on different second antenna resonant modes, the length of the slot structure 750 may be adjusted to a quarter wavelength of the resonant frequency of the second antenna resonant mode. For related principles, reference may be made to the description in the first embodiment, and details are not described herein. In this way, the antenna module 720 may have a larger bandwidth without being disposed with a clearance area.

Figure 8:
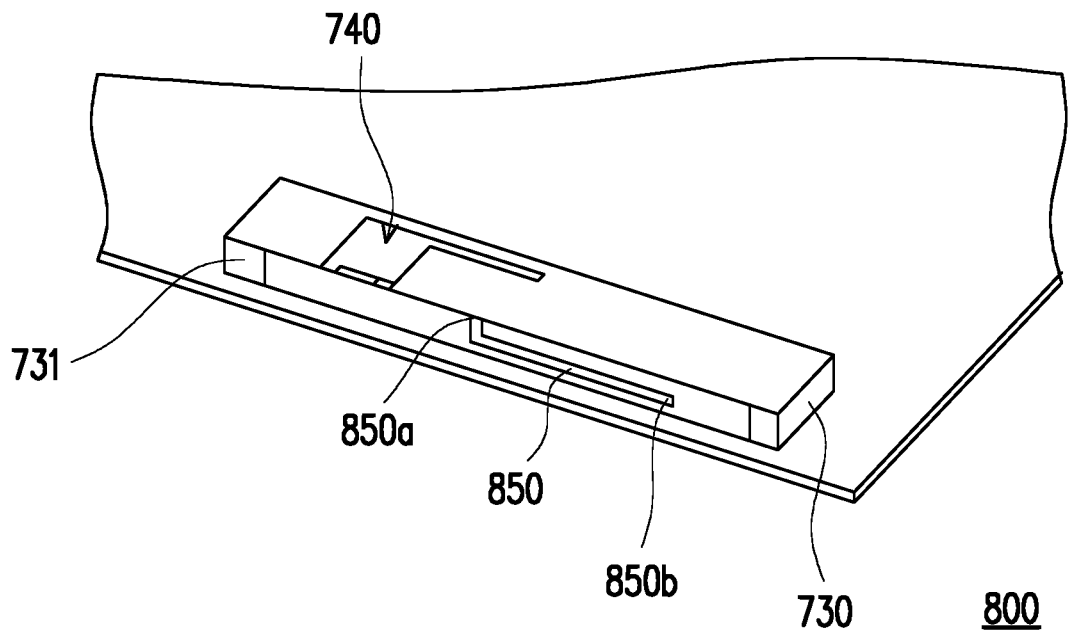
FIG. 8 is an oblique view of an electronic device according to a seventh embodiment of the disclosure.

With reference to FIG. 8, FIG. 8 is an oblique view of an electronic device according to a seventh embodiment of the disclosure. In FIG. 8, the aspect of an electronic device 800 is substantially the same as the electronic device 700 of the sixth embodiment, except that a slot structure 850 in the electronic device 800 may be presented in an aspect different from the slot structure 750.

Specifically, the slot structure 850 is, for example, an L-shaped slot disposed on the side 731 of the substrate 730 and may have an open end 850a and a closed end 850b, wherein the slot structure 850 and the antenna structure 740 may be located on different planes. Also, as shown in FIG. 8, the open end 850a and the closed end 850b in the embodiment may be located on different planes.

In summary of the above, with the disposition of the slot structure, the antenna module provided by the disclosure can generate the first antenna resonant mode through the excited antenna structure and, at the same time, can allow the slot structure to be coupled to the antenna structure to generate the second antenna resonant mode. In this way, the antenna module can achieve a larger bandwidth without being disposed with a clearance area. Moreover, the overall height of the antenna module can also be less limited.

In addition, the antenna structure provided by the disclosure can be disposed on the substrate integrally with the slot structure as needed, and the aspects of the antenna structure and the slot structure can also be changed as needed, thereby effectively improving the flexibility in the antenna design.

Although the disclosure has been described with reference to the above embodiments, it will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An antenna module adapted for an electronic device, the electronic device having a metal casing, the antenna module comprising:

an antenna structure comprising a radiation portion, a feeding portion, a ground portion and an extension portion, wherein the feeding portion, the ground portion and the extension portion are connected to the radiation portion; and a slot structure having an open end and a closed end, wherein the open end of the slot structure is adjacent to the extension portion of the antenna structure, wherein the antenna structure is excited and resonates to generate a first antenna resonant mode, and the slot structure is coupled to the antenna structure and resonates to generate a second antenna resonant mode, wherein the metal casing has a bottom surface, and a first orthographic projection of the whole antenna structure on the bottom surface of the metal casing does not overlap with a second orthographic projection of the whole slot structure on the bottom surface of the metal casing at all.

2. The antenna module according to claim 1, wherein the open end is coupled to a terminal end of the extension portion and resonates to generate the second antenna resonant mode.

3. The antenna module according to claim 2, wherein the open end is spaced from the terminal end of the extension portion by a first distance, the closed end is spaced from the feeding portion by a second distance, and the first distance is less than the second distance.

4. The antenna module according to claim 1, wherein the antenna module further comprises a substrate disposed in the metal casing, and the antenna structure is disposed on the substrate.

5. The antenna module according to claim 4, wherein the substrate has a side, and the slot structure is disposed on the side of the substrate.

6. The antenna module according to claim 1, wherein the metal casing has a side, and the extension portion extends from the radiation portion to a vicinity of the side of the metal casing.

7. The antenna module according to claim 1, wherein the ground portion contacts the metal casing.

8. The antenna module according to claim 1, wherein the metal casing has a side, and the slot structure is disposed on the side of the metal casing.

9. The antenna module according to claim 1, wherein a length of the slot structure is a quarter wavelength of a resonant frequency of the second antenna resonant mode.

10. The antenna module according to claim 1, wherein the open end and the closed end are located on different planes.

11. The antenna module according to claim 1, wherein the open end and the closed end are located on the same plane.

12. The antenna module according to claim 1, wherein the open end and the antenna structure are located on different planes.

13. The antenna module according to claim 1, wherein the open end and the antenna structure are located on the same plane.

14. The antenna module according to claim 1, wherein the metal casing has a side and a bottom, and the slot structure is disposed on the metal casing and extends from the side of the metal casing to the bottom of the metal casing.

* * * * *